(12) United States Patent
Logan et al.

(10) Patent No.: US 8,489,557 B2
(45) Date of Patent: Jul. 16, 2013

(54) METHOD, SYSTEM AND APPARATUS FOR ARCHIVING DATA

(75) Inventors: Adrian Michael Logan, Milton (CA); Neeraj Garg, Milton (CA)

(73) Assignee: Research In Motion Limited, Waterloo, ON (CA)

( * ) Notice: Subject to any disclaimer, the term of this patent is extended or adjusted under 35 U.S.C. 154(b) by 377 days.

(21) Appl. No.: 12/728,628

(22) Filed: Mar. 22, 2010

(65) Prior Publication Data
US 2011/0231371 A1 Sep. 22, 2011

(51) Int. Cl.
*G06F 17/30* (2006.01)

(52) U.S. Cl.
USPC .......................................... 707/671

(58) Field of Classification Search
USPC .......................................... 707/665, 668, 671
See application file for complete search history.

(56) References Cited

U.S. PATENT DOCUMENTS

| 5,515,502 | A  | * | 5/1996  | Wood .................................. 714/15 |
| 5,930,337 | A  | * | 7/1999  | Mohler ........................ 379/88.22 |
| 6,240,427 | B1 | * | 5/2001  | Szalwinski et al. ................ 1/1 |
| 6,757,711 | B2 | * | 6/2004  | Toga ................................ 709/203 |
| 7,117,294 | B1 | * | 10/2006 | Mi et al. .......................... 711/101 |
| 2002/0103005 | A1 | * | 8/2002 | Watts et al. ..................... 455/556 |
| 2005/0102329 | A1 | * | 5/2005 | Jiang et al. ...................... 707/204 |
| 2006/0179061 | A1 | * | 8/2006 | D'Souza et al. ................ 707/10 |
| 2007/0136397 | A1 |   | 6/2007 | Pragada et al. |
| 2007/0179999 | A1 | * | 8/2007 | Kamei et al. ................... 707/204 |
| 2008/0307018 | A1 | * | 12/2008 | Ulrich et al. ................... 707/204 |
| 2009/0007143 | A1 | * | 1/2009 | Chang et al. ................... 719/318 |
| 2009/0094297 | A1 |   | 4/2009 | Canu et al. |
| 2010/0321183 | A1 | * | 12/2010 | Donovan et al. .............. 340/540 |

FOREIGN PATENT DOCUMENTS

| EP | 1712990 A2 | 10/2006 |
| WO | 2008/070688 A1 | 6/2008 |

OTHER PUBLICATIONS

Indian University, University Information Technology Services, The AutoArchive Function, downloaded from http://uits.iu.edu/page/aead.
Blackberrycool, The Voice of the Blackberry Community, downloaded from http://www.blackberrycool.com/2009/07/28/blackberry-tip-use-gmail-to-archive-deleted-blackberry-messages/.
Google groups, Gmail Help Discussion, downloaded from http://groups.google.com/group/Gmail-Help-POP-and-IMAP-en/browse_thread/thread/15a0a2e01a693ffc.
Crackberry.com, downloaded from http://forums.crackbeny.com/f52/gmail-archive-not-delete-116653/.
European Patent Application No. 10 15 7245.1 Search Report dated Jul. 1, 2010.

* cited by examiner

*Primary Examiner* — Jorge A Casanova
(74) *Attorney, Agent, or Firm* — Perry + Currier

(57) ABSTRACT

A method, server and mobile electronic device for archiving data are provided. The server determines that an amount of the data managed by the server meets a threshold condition and in response transmits a message to the mobile electronic device associated with the data, the message indicative that the threshold condition has been met. The mobile electronic device responds to the message with a response indicative that the data is to be archived. The response triggers the server to cause at least a portion of the data to be archived, thereby increasing memory available for storing further data.

24 Claims, 9 Drawing Sheets

METHOD, SYSTEM AND APPARATUS FOR ARCHIVING DATA

FIELD

The specification relates generally to archiving data, and specifically to a method, system and apparatus for archiving data.

BACKGROUND

Methods and systems for archiving data managed by a server are limited and lead to data being lost when storage limits are reached. Specifically, archiving of data managed by a server is often triggered by a computing device; when the computing device is unable to trigger archiving, and storage limits are reached, further data received is discarded and/or lost.

BRIEF DESCRIPTIONS OF THE DRAWINGS

Embodiments are described with reference to the following figures, in which.

DETAILED DESCRIPTION OF THE EMBODIMENTS

Figure 1:
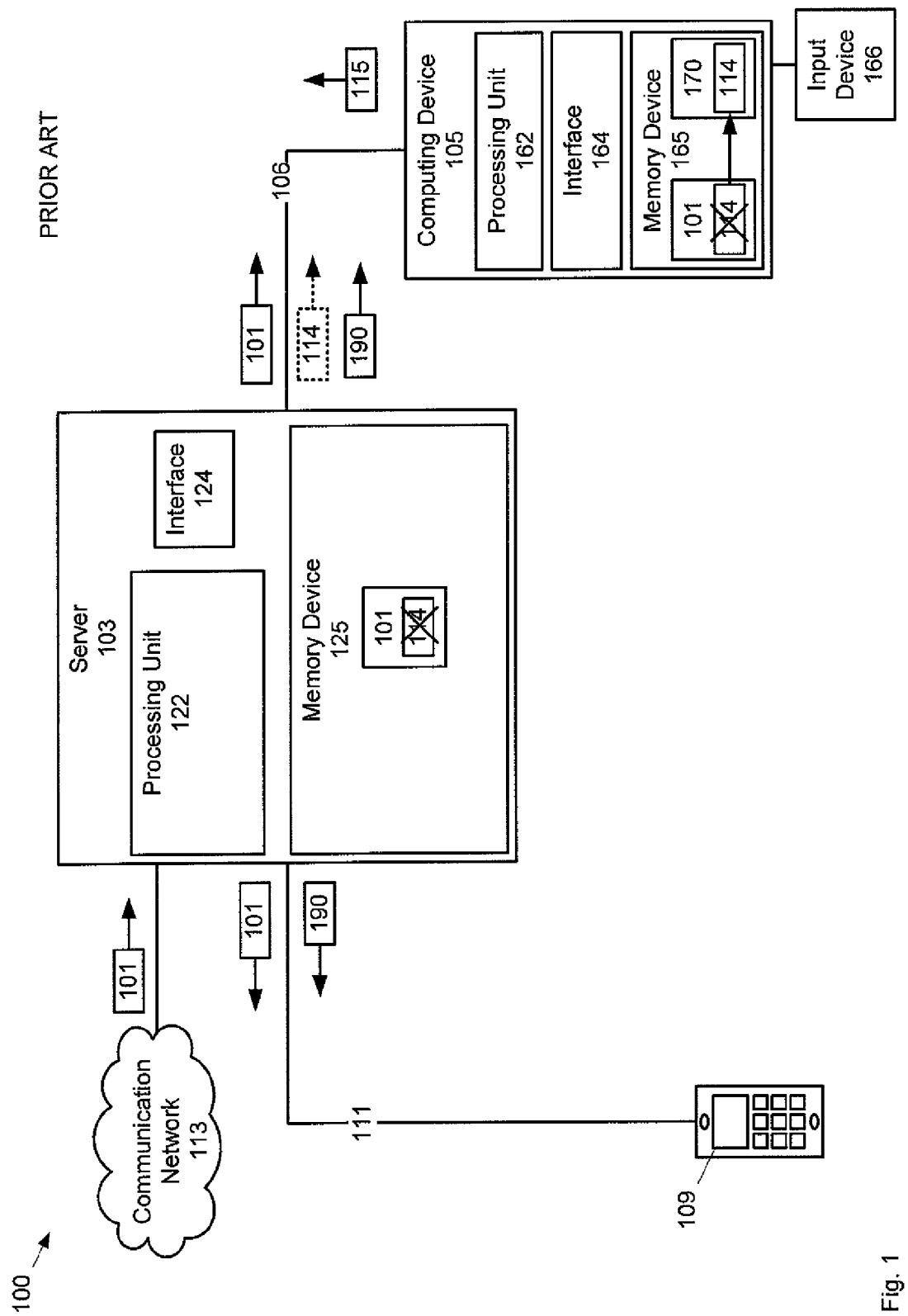
FIG. 1 depicts a block diagram of a system for archiving data, according to the prior art.

Data intended for a computing device (e.g. email and/or event data, etc.) can be received and stored at a server for viewing at the computing device. However, a given computing device will generally be assigned a given amount of memory at the server for data storage. When the amount of data at the server reaches a threshold, no further data can be stored until at least a portion of the existing data is archived. If archiving doesn't occur, further data received can be lost. While automatic archiving events can be scheduled, the threshold can be reached well in advance of the next event. To address this, an archive command can be initiated at the computing device, and transmitted to the server, which triggers the server to transit at least a portion of the data to the computing device for archiving in local storage. This situation becomes problematic during absences from the computing device (e.g. vacations): if the threshold is reached during the absence, all further data received can be lost until access to the computing device resumes and the archiving command is transmitted.

A first aspect of the specification provides a method for archiving data managed by a server. The method comprises determining that an amount of the data managed by the server meets a threshold condition. The method further comprises transmitting a message from the server to a mobile electronic device associated with the data, the message indicative that the threshold condition has been met. The method further comprises receiving a response at the server from the mobile electronic device indicative that the data is to be archived. The method further comprises causing at least a portion of the data to be archived thereby increasing memory available for storing further data.

Determining that the amount of the data managed by the server meets the threshold condition can comprise at least one of determining that the amount of data meets or exceeds a threshold amount of memory; determining that the amount of data meets or exceeds a threshold percentage of memory; and determining that the amount of data meets or exceeds a threshold number of files.

Transmitting the message to the mobile electronic device can comprise transmitting an e-mail to the mobile electronic device, the e-mail comprising an option to trigger archiving of the data.

Receiving a response from the mobile electronic device indicative that the data is to be archived can comprise receiving at least one of an e-mail, a text message, an SMS (short message service) message, an MMS (multimedia message service) message and wireless network data.

The message can comprise a selectable option to trigger transmitting the response from the mobile electronic device.

Causing at least the portion of the data to be archived can comprise: transmitting an archive command to a computing device causing a copy of the at least the portion stored at the computing device to be archived at the computing device; and deleting the at least the portion of the data managed by the server. The method can further comprise transmitting the copy of the at least the portion to the computing device at least one of prior to the transmitting the archive command and with the archive command. The method can further comprise, when the computing device is in not communication with the server, waiting until the computing device is in communication with the server before the transmitting occurs. The method can further comprise transferring the at least the portion to an archive directory in association with the waiting such that the further data can be stored. The method can further comprise deleting the at least the portion from the archive directory when communications between the computing device and the server are established.

Causing at least the portion of the data to be archived can comprise transferring at least the portion of the data to an archive directory at, at least one of the server and a second server.

A second aspect of the specification can comprise a server for archiving data. The server comprises a processing unit interconnected with a communication interface. The processing unit enabled to: determine that an amount of the data managed by the server meets a threshold condition; transmit, via the communication interface, a message from the server to a mobile electronic device associated with the data, the message indicative that the threshold condition has been met; receive, via the communication interface, a response at the server from the mobile electronic device indicative that the data is to be archived; and cause at least a portion of the data to be archived thereby increasing memory available for storing further data.

To determine that the amount of the data managed by the server meets the threshold condition, the processing unit can be further enabled to at least one of: determine that the amount of data meets or exceeds a threshold amount of memory; determine that the amount of data meets or exceeds a threshold percentage of memory; and determine that the amount of data meets or exceeds a threshold number of files.

To transmit the message to the mobile electronic device the processing unit can be further enabled to transmit, via the communication interface, an e-mail to the mobile electronic device, the e-mail comprising an option to trigger archiving of the data.

To receive a response from the mobile electronic device indicative that the data is to be archived, the processing unit can be further enabled to receive at least one of an e-mail, a text message, an SMS (short message service) message, an MMS (multimedia message service) message and wireless network data.

The message comprises a selectable option to trigger the mobile electronic device to transmit the response to the server.

To cause at least the portion of the data to be archived, the processing unit can be further enabled to: transmit an archive command to a computing device causing a copy of the at least the portion stored at the computing device to be archived at the computing device; and delete the at least the portion of the data managed by server. The processing unit can be further enabled to transmit the copy of the at least the portion to the computing device at least one of: prior to transmitting the archive command; and with the archive command. The processing unit can be further enabled to, when the computing device is in not communication with the server, wait until the computing device is in communication with the server before the transmitting occurs. The processing unit can be further enabled to transfer the at least the portion to an archive directory, while waiting until the computing device is in communication with the server, such that the further data can be stored. The processing unit can be further enabled to delete the at least the portion from the archive directory when communications between the computing device and the server are established.

To cause at least the portion of the data to be archived, the processing unit can be further enabled to transfer at least the portion of the data to an archive directory stored at a memory device at, at least one of the server and a second server.

A third aspect of the specification provides a mobile electronic device for archiving data. The mobile electronic device provides a processing unit interconnected with a communication interface. The processing unit is enabled to: receive, via the communication interface, a message from a server, the message indicative that an amount of the data managed by the server meets a threshold condition; and transmit, via the communication interface, a response to the server indicative that the data is to be archived, the response causing the server to archive at least the portion of the data thereby increasing an amount of memory managed by the server to be available for storing further data.

A fourth aspect of the specification provides a computer program product, comprising a computer usable medium having a computer readable program code adapted to be executed to implement a method for archiving data managed by a server. The method comprises: determining that an amount of the data managed by the server meets a threshold condition; transmitting a message from the server to a mobile electronic device associated with the data, the message indicative that the threshold condition has been met; receiving a response at the server from the mobile electronic device indicative that the data is to be archived; and causing at least a portion of the data to be archived thereby increasing memory available for storing further data.

For example, FIG. 1 depicts a system 100 for archiving data 101 managed by a server 103, according to the prior art. Server 103 is enabled for communication with a computing device 105, via a link 106 and a mobile electronic device 109, via a link 111. Server 103 is further enabled to receive data 101 via a communication network 113, which can be wired or wireless as desired. For example, data 101 can comprise any suitable number of e-mails, event data, etc., intended for transmission to computing device 105, and originally transmitted by at least one other computing device (not depicted) in communication with communication network 113. Furthermore, data 101 can comprise a subset 114 that can be archived; for example, subset 114 can comprise data that meets any suitable given criteria, such as e-mail, event data etc. received before a given date, e-mail, event data etc., that exceeds a given amount of memory, and the like. Server 103 generally comprises a processing unit 122 interconnected with a communication interface 124 and a memory device 125.

In any event, data 101, including subset 114, is received and managed at server 103, in memory device 125. Data 101 is generally viewable at computing device 105 and/or mobile electronic device 109 either via a client/server session established between computing device 105 and server 103 (or between computing device 105 and server 103) or by transmitting data 101, or a copy thereof, to computing device 105 (and/or by transmitting data 101, or a copy thereof, to mobile electronic device 109) for viewing. Data 101 can either be requested by computing device 105 and/or mobile electronic device 109, respectfully, via links 106, 111, respectively, or pushed to the computing device 105 and/or mobile electronic device 109 by server 103 when links 106, 111 are active. Furthermore, data 101 can be requested and/or pushed periodically, and/or server 103 can push data 101 to computing device 105 and/or mobile electronic device 109 when data 101 is received at server 103. However, data 101, or a copy thereof, is also maintained in memory device 125 at server 103.

Furthermore, archiving of data 101 can occur. For example, computing device 105 periodically, and/or upon receipt of input data, transmits an archive command 115 to server 103. Archive command 115 triggers server 103 to transmit the data to be archived, for example subset 114, or a copy thereof, to computing device 105 for storage, and to delete subset 114 from server 103, thereby increasing the amount of memory available to store further data received at server 103.

Furthermore, computing device 105 comprises a processing unit 162 interconnected with a communication interface 164, a memory device 165, and an input device 166. Processing unit 162 is enabled to control memory device 165 to store subset 114 in an archive portion 170 of memory device 165 for archiving data, for example an archive folder and/or an archive file, such that when archiving occurs, subset 114 is transferred from data 101 to archive portion 170. In effect, subset 114 is deleted from data 101 and copied and/or transferred to archive portion 170.

When data 101 and subset 114 are already stored at computing device 105 prior to transmission of archiving command 115, for example due to an earlier transmission of data 101, then archive command 115 triggers server 103 to delete subset 114 from memory device 165, without an additional transmission of subset 114 to computing device 105; it is understood that subset 114 already stored at memory device 165 is copied and/or transferred to archive portion 170.

It is generally understood that only a portion of memory device 125 at server 103 is allotted for storing data 101. Once data 101 reaches a given threshold and/or storage limit, for example a total given amount and/or percentage of memory device 125, any further data received will either be discarded and/or not transmitted to computing device 105 and/or mobile electronic device 109. Hence, further data transmitted to computing device 105 via server 103 is lost. Warning data 190 can be transmitted to computing device 105 and/or mobile electronic device 109 as the given threshold is approached and/or when and/or after the given threshold is met, warning data 190 comprising text for display at computing device 105 and/or mobile electronic device 109 indicating that the given threshold is being approached and/or has been met. For example, warning data 190 can comprise the text "Your mailbox is over its size limit". However, regardless of warning data 190, unless archive command 115 is transmitted from computing device 105 to server 103, archiving will not occur and the further data will be lost.

Figure 2:
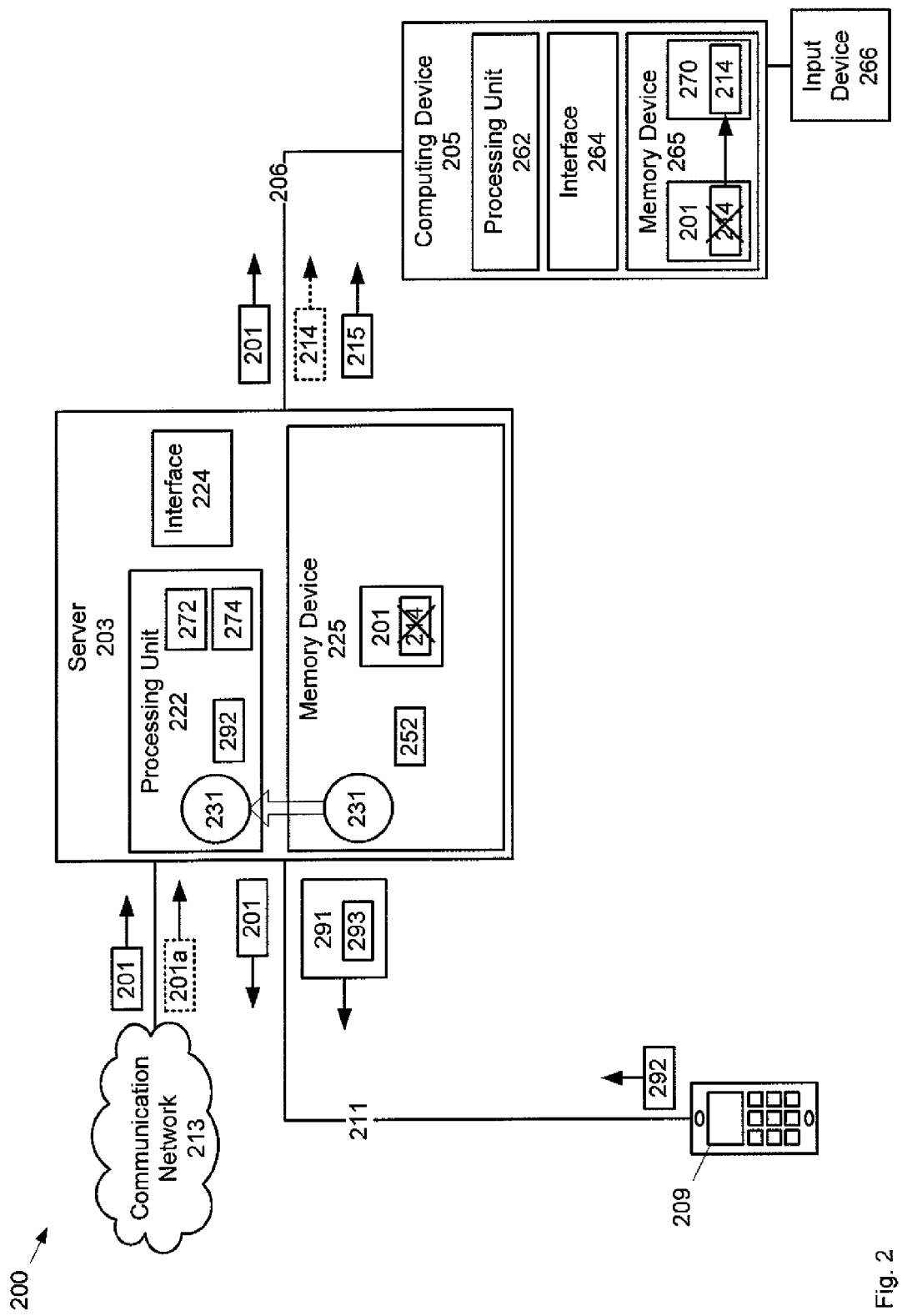
FIG. 2 depicts a block diagram of a system for archiving data, according to non-limiting embodiments.

Attention is now directed to FIG. 2, which depicts a system 200 for archiving data, for example data 201 managed by a server 203, according to non-limiting embodiments. In general, system 200 is similar to system 100 of FIG. 1, with like elements having like numbers, however preceded by a "2" rather than a "1": for example server 203 is similar to server 103. However, in system 200, server 203 is enabled to determine that an amount of data 201 managed by server 203 meets a threshold condition 252 and in response transmits a message 291 to mobile electronic device that threshold condition 252 has been met. Threshold condition 252 can comprise any suitable threshold data, including but not limited to: a given amount of memory occupied by data 201 on memory device 225; a given percentage of memory occupied by data 201 on memory device 225; a given number of files that can be present in data 201, including but not limited to a given number of e-mails and/or event data. In some embodiments, threshold condition 252 can be less than a storage limit for data 201 on memory device 225, for example an amount of memory allotted to data 201 which, when reached or exceeded, further data received for storage is discarded. In other embodiments, threshold condition 252 can be similar to the storage limit.

Furthermore, mobile computing device 209 is enabled to transmit a response 292 to message 291 indicative that data 201 is to be archived. Response 292 hence triggers an archiving event when received at server 203, which causes at least a portion of data 201 to be archived thereby increasing memory available at server 203 for storing further data. Various non-limiting embodiments for archiving will be described below with reference to FIGS. 4-8. However, system 200 will first be described in further detail.

Link 211 generally comprises a wireless link between mobile electronic device 209 and server 203. Link 211 can hence comprise a wireless network, such as a wireless carrier network, including but not limited to any suitable cell phone network (1X, UMTS (Universal Mobile Telecommunications System), CDMA (code division multiple access), GSM (Global System for Mobile communications), 3G, EDGE, and the like), in combination with any suitable combination of wired or wireless networks as desired, including but not limited to a packet based network, the Internet, an analog network, the PSTN (public switched telephone network), a WiFi network, a WiMax network and the like. In some embodiments, link 211 can comprise communication network 213, which can be wired or wireless as desired.

Similarly, link 206 can comprise any suitable combination of wired or wireless networks as desired, including but not limited to a packet based network, the Internet, an analog network, the PSTN, a WiFi network, a WiMax network and the like. In some embodiments, link 206 can comprise communication network 213.

Mobile electronic device 209 can comprise any suitable mobile electronic device and/or mobile computing device and/or mobile communication device, including but not limited to a laptop or notebook computer, a PDA, a cellular or mobile phone, a portable electronic device, or the like. However, other suitable types of mobile electronic devices are within the scope of present embodiments. Mobile electronic device 109 is described in more detail below with reference to FIG. 3.

Server 203 comprises a processing unit 222, a communications interface 224 and memory device 225 all in communication, for example, via a computing bus (not depicted). Server 203 comprises any suitable computing device for storing data 201. Server 203 can include but is not limited to any suitable combination of a computer, a mainframe computer, a server and the like. Other suitable types of computing devices are within the scope of present embodiments.

Memory device 225 can be any suitable one of or combination of volatile memory, non-volatile memory, RAM, ROM, hard drive, optical drive, or the like. In particular, memory device 225 is enabled to store data 201. Furthermore, memory device 225 can comprise an application 231 which, when processed by processing unit 222, causes processing unit 222 to determine when data 201 meets threshold condition 252 for transmitting message 291.

Processing unit 222 can comprise any suitable processor, or combination of processors, including but not limited to a microprocessor, CPU (central processing unit), or the like. Processing unit 222 can comprise a comparator 272 for comparing values including but not limited to alphanumeric values, and a calculator 274 for performing mathematical operations on numerical values and/or performing textual operations on text values. In particular, calculator 274 can determine characteristic of data 201, such as the amount of memory device 225 occupied by data 201, and comparator 272 can determine when threshold condition 252 has been met by comparing a determined characteristic of data 201 with threshold condition 252.

Communications interface 224 is enabled to communicate with computing device 205 via link 206, with mobile electronic device 209 via link 211, and with communication network 213. Accordingly, communications interface 224 is enabled to communicate according to any suitable protocol which is compatible with links 206, 211 and a communication network 213, including but not limited to packet based protocols, Internet protocols, analog protocols, cell phone protocols (1X, UTMS, CDMA, GMS, 3G, EDGE and the like), WiFi protocols, WiMax protocols and/or a combination of these. Other suitable protocols are within the scope of present embodiments.

Computing device 205 comprises a processing unit 262, a communication interface 264, and a memory device 265, all in communication, for example, via a computing bus (not depicted). Each of processing unit 262, communication interface 264, and memory device 265 can be respectively similar to processing unit 222, communication interface 224, and memory device 225 described above. In particular, computing device 205 is enabled to communicate with server 203, via link 206. Furthermore, computing device 205 is enabled to archive subset 214 of data 201 in archiving portion 270 upon receipt of an archive command 215 from server 203 as will be described below.

Figure 3:
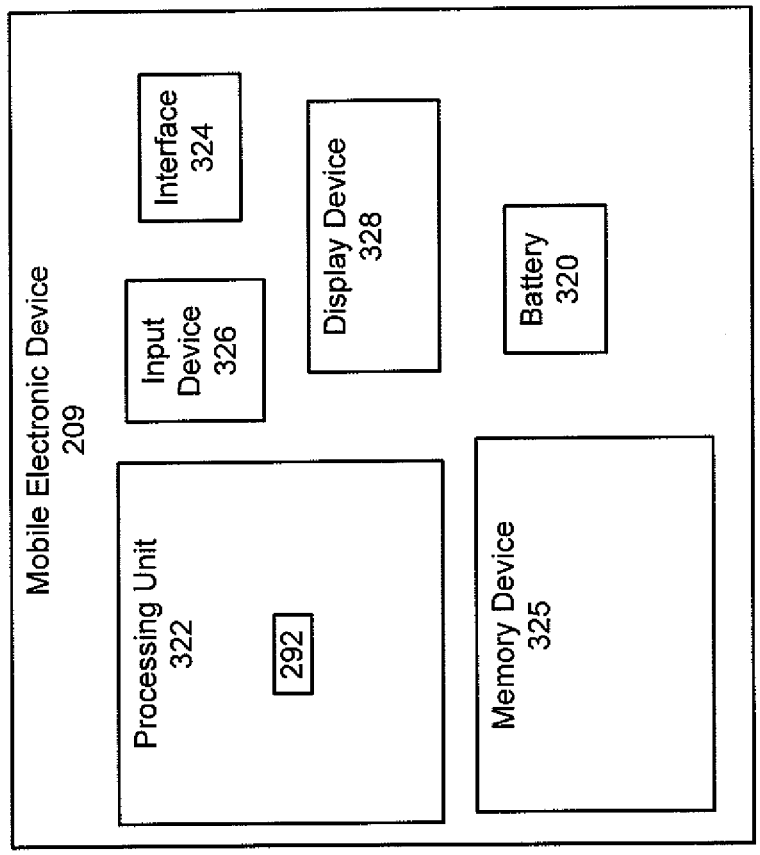
FIG. 3 depicts a block diagram of a mobile electronic device for triggering archiving of data, according to non-limiting embodiments.

Attention is now directed to FIG. 3, which depicts mobile electronic device 209, according to non-limiting embodiments. Mobile electronic device 209 comprises a processing unit 322, a communication interface 324, and a memory device 325, an input device 326 and a display device 328, all in communication, for example, via a computing bus (not depicted), and powered by battery 330. Each of processing unit 322, communication interface 324, and memory device 325 can be respectively similar to processing unit 222, communication interface 224, and memory device 225 described above. It is understood that communication interface 324 is enabled to communicate with server 103 via link 211 via any suitable wireless protocol.

Mobile electronic device 209 is further enabled to generate response 292 to message 291. Response 292 can comprise any suitable data including but not limited to an e-mail, a text message, SMS (short message service) data, MMS (multimedia message service) data, and/or any suitable wireless network data. In general it is understood that response 292 triggers an archiving event at server 203 as described hereafter.

Figure 4:
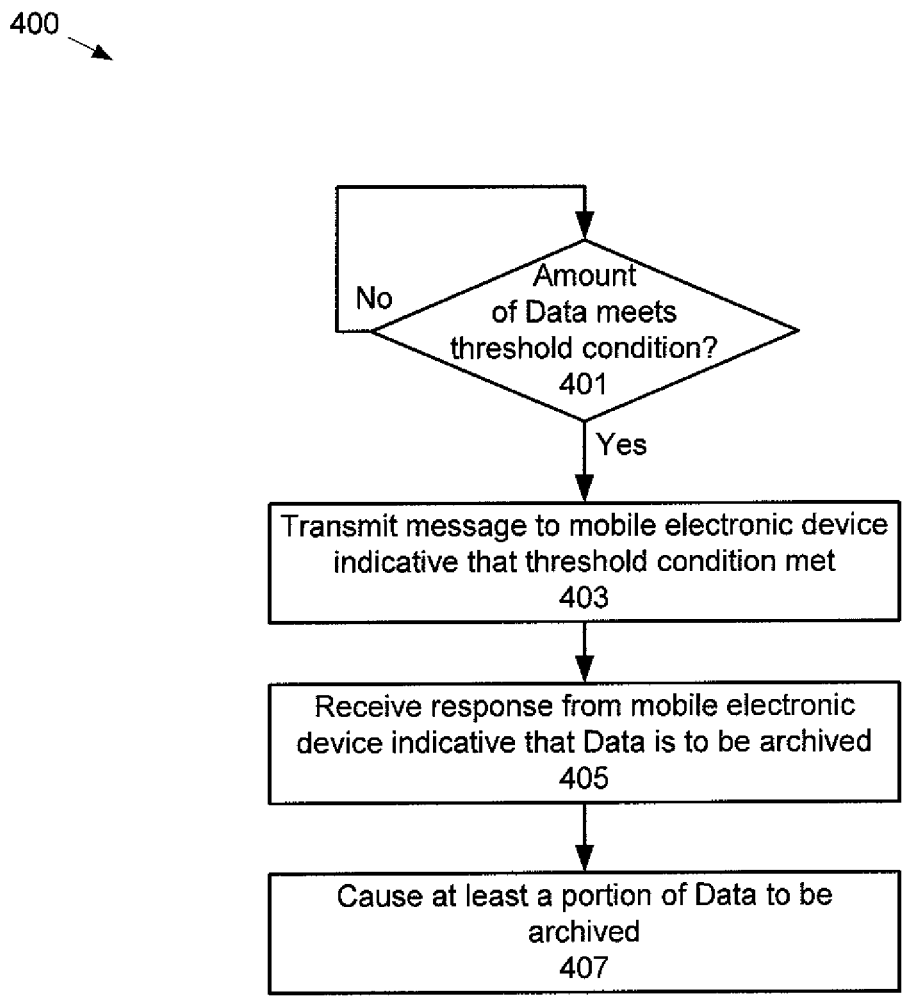
FIG. 4 depicts a flow chart diagram of a method for archiving data, according to non-limiting embodiments.

Attention is now directed to FIG. 4 which depicts a method 400 for archiving data. In order to assist in the explanation of method 400, it will be assumed that method 400 is performed using system 200. Furthermore, the following discussion of method 400 will lead to a further understanding of system 200 and its various components. However, it is to be understood that system 200 and/or method 400 can be varied, and need not work exactly as discussed herein in conjunction with each other, and that such variations are within the scope of present embodiments.

At step 401, server 203 monitors the amount of data 201 stored in memory device 225. For example, in some embodiments, calculator 272 can calculate the amount of space that data 201 occupies in memory device 225, and comparator 274 can compare the amount with threshold condition 252. When the amount of space that data 201 occupies in memory device 225 meets threshold condition 252, then threshold condition 252 is met. In some embodiments, step 401 includes at least one of determining that an amount of data 201 meets or exceeds a threshold amount of memory; determining that an amount of data 201 meets or exceeds a threshold percentage of memory; and determining that an amount of data 201 meets or exceeds a threshold number of files.

When threshold condition 252 is not met, then step 401 is repeated. In some embodiments, step 401 can be repeated periodically and/or when further data 201a arrives at server 203 and is stored in data 201.

When threshold condition 252 is met, then at step 403, server 203 transmits message 291 to mobile electronic device 209. It is generally understood that mobile electronic device 209 is associated with data 201 (e.g. server 203 is enabled to transmit data 201 to computing device 205 and mobile electronic device 201). Furthermore, message 291 is indicative that that threshold condition 252 has been met. Message 291 can hence comprise any suitable data indicative that the threshold condition 252 has been met, such as text 501 of FIG. 5, described below. In some embodiments, message 291 can comprise an option 293 to trigger archiving of data 201.

Figure 5:
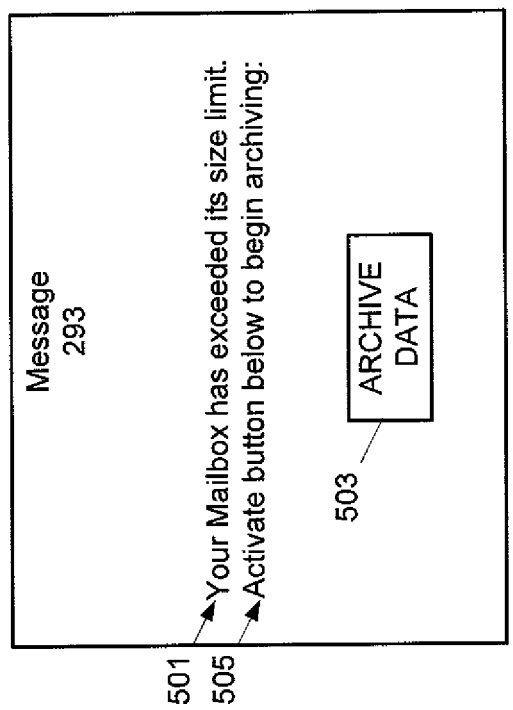
FIG. 5 depicts a representation of a message for notifying that a threshold condition for archiving has been met, according to non-limiting embodiments.

For example, as depicted in FIG. 5, which comprises a representation 500 of message 291 displayed at display device 328, message 291 can comprise an e-mail that includes text 501 indicative that threshold condition 252 has been met ("Your Mailbox has exceeded its size limit") and a selectable virtual button 503 that, when activated at mobile electronic device 209, causes mobile electronic device 209 to transmit response 292 to server 203 which in turn triggers archiving of data 201. Hence option 293 can comprise button 503. In some embodiments, as also depicted in FIG. 5, message 291 can further comprise text 505 comprising instructions for using button 503. However, message 291 can comprise any suitable selectable option to trigger transmitting response 292 from mobile electronic device 209 and/or any suitable option to trigger archiving of data 201.

In other embodiments, response 292 can be generated at mobile electronic device 209 using any suitable method. For example, after receiving message 291, response 292 can be generated by receiving input data via input device 326 indicative that response 292 is to be generated and transmitted; an e-mail, SMS, MMS, and the like can be generated and transmitted to server 203 indicating that archiving of data 201 is to occur. For example, an e-mail, SMS, MMS and the like can be transmitted to server 203 with the command "Archive", or the like, in a subject line and/or a body of the e-mail/SMS/MMS etc. Furthermore, in some embodiments, mobile electronic device 209 can comprise a dedicated application for generating response 292.

As has been already described, response 292 can comprise any suitable format including but not limited to e-mail, SMS, MMS, and wireless network data. In embodiments where response 292 comprises wireless network data, data for causing server 203 to archive data 201 can be piggybacked on existing wireless network data.

In any event, returning to FIG. 4, at step 405, response 292 is received at server 203 from mobile electronic device 209, response 292 indicative that data 201 is to be archived.

At step 407, server 203 causes at least a portion of data 201 to be archived thereby increasing memory available at server 203 for storing further data, for example data 201a which, in these embodiments, is understood to arrive after archiving has occurred.

Hence, in present embodiments, mobile electronic device 209 is enabled to trigger archiving of data 201 via response 292, such that further data arriving at server 203 for transmission to computing device 205 and/or mobile electronic device 209 is not lost due to a storage limit for data 201 at server 203 being reached or exceeded.

Step 407 can comprise any suitable method for archiving data 201. In some embodiments, as depicted in FIG. 2, assuming link 206 is active and server 203 can communicate with computing device 205, server 203 transmits an archive command 215 to computing device 205, causing subset 214 stored at computing device 205, to be archived by transferring subset 214 from data 201 to archive portion 270. In some embodiments, archive command 215 can comprise response 292 (e.g. response 292 is forwarded to computing device 205 by server 203). Furthermore, subset 214 is deleted from server 203. Note that this is in contrast to the prior art in FIG. 1 where archive command 115 is transmitted from computing device 105 to server 103: rather, in present embodiments, archive command 215 is transmitted from server 203 to computing device 205, triggered by response 292 received from mobile electronic device 209.

In some embodiments, transmission of archive command 215 is accompanied by transmission of subset 214, or a copy thereof. In other embodiments, it is understood that subset 214, or a copy thereof, is already stored at computing device 205 (e.g. due to previous transmission of subset 214 or copy thereof, and/or a synchronization event) and subset 214 is not transmitted to computing device 205 with archive command 215.

Figure 6:
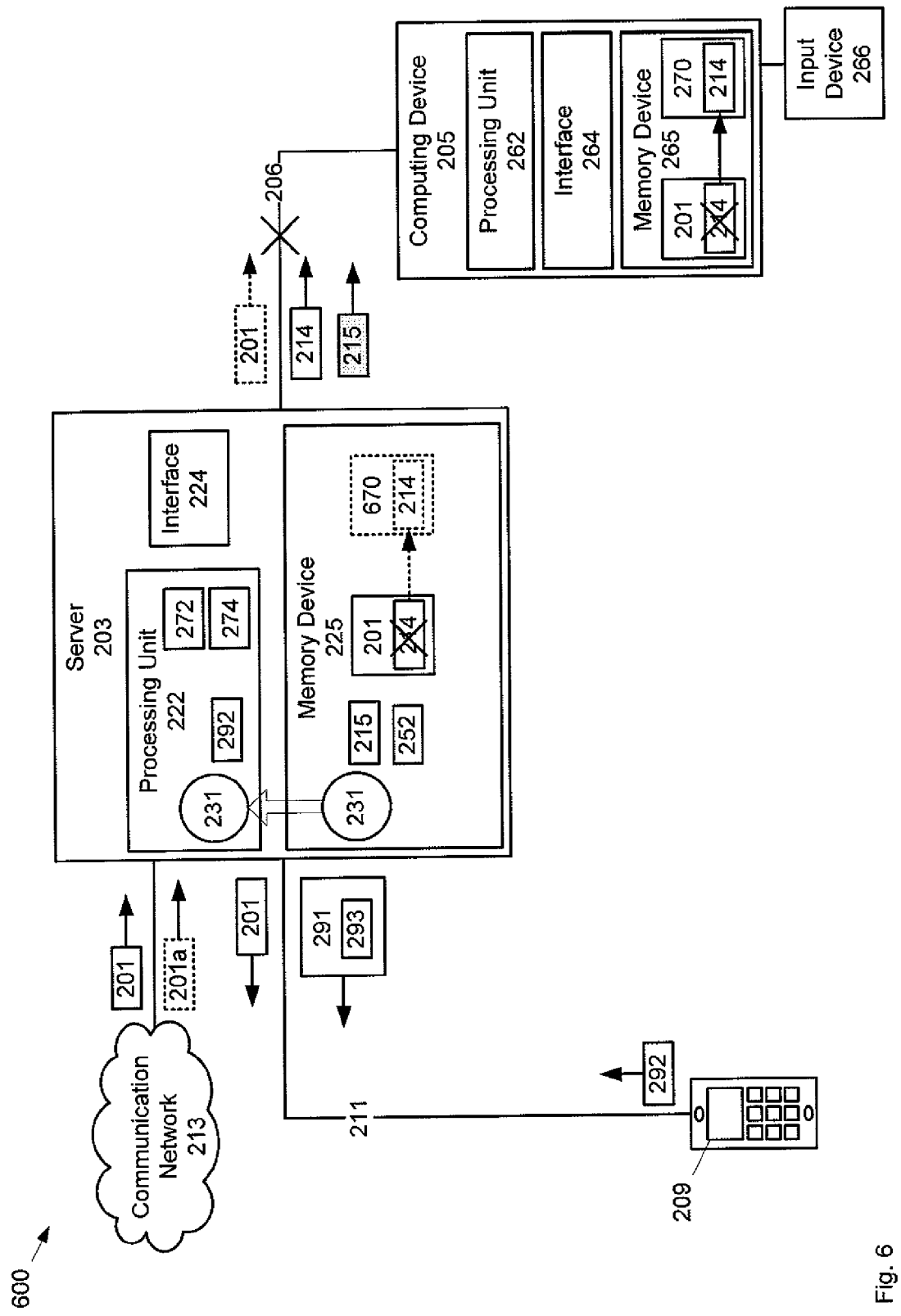
FIGS. 6-9 depict block diagrams of systems for archiving data, according to non-limiting embodiments.

Attention is now directed to FIG. 6 which depicts a system 600, similar to system 200 of FIG. 2, with like elements having like numbers. Method 400 can also be implemented in system 600. However, in these embodiments, link 206 is not active when response 292 is received. For example, link 206 can be down due to network problems and/or computing device 205 can be off and/or interface 264 can be experiencing problems. Hence, server 203 determines that computing device 205 cannot be communicated with, and stores archive command 215 in memory device 225 until computing device 205 is in communication with server 203. After communications are re-established (i.e. link 206 becomes active) transmission of archive command 215 occurs as described above with reference to FIG. 2 (as well as transmission of subset 214 if desired, and/or any other portion of data 201 received at server 204 while link 206 was inactive). In some embodiments, transmission of data 201 and/or subset 214 and/or any other portion of data 201 received at server 204 while link 206 was inactive while link 206 was inactive can occur prior to transmission of archive command 215.

In some embodiments depicted in FIG. 6, waiting to transmit archive command 215 can be accompanied by transferring subset 214 from data 201 to an archive portion 670 of memory device 225, thereby increasing memory available at server 203 for storing further data. In some of these embodiments, when link 206 and/or computing device 205 becomes available, and archive command 215 and subset 214 are transmitted sent to computing device 205, then subset 214 is deleted from memory device 225.

Figure 7:
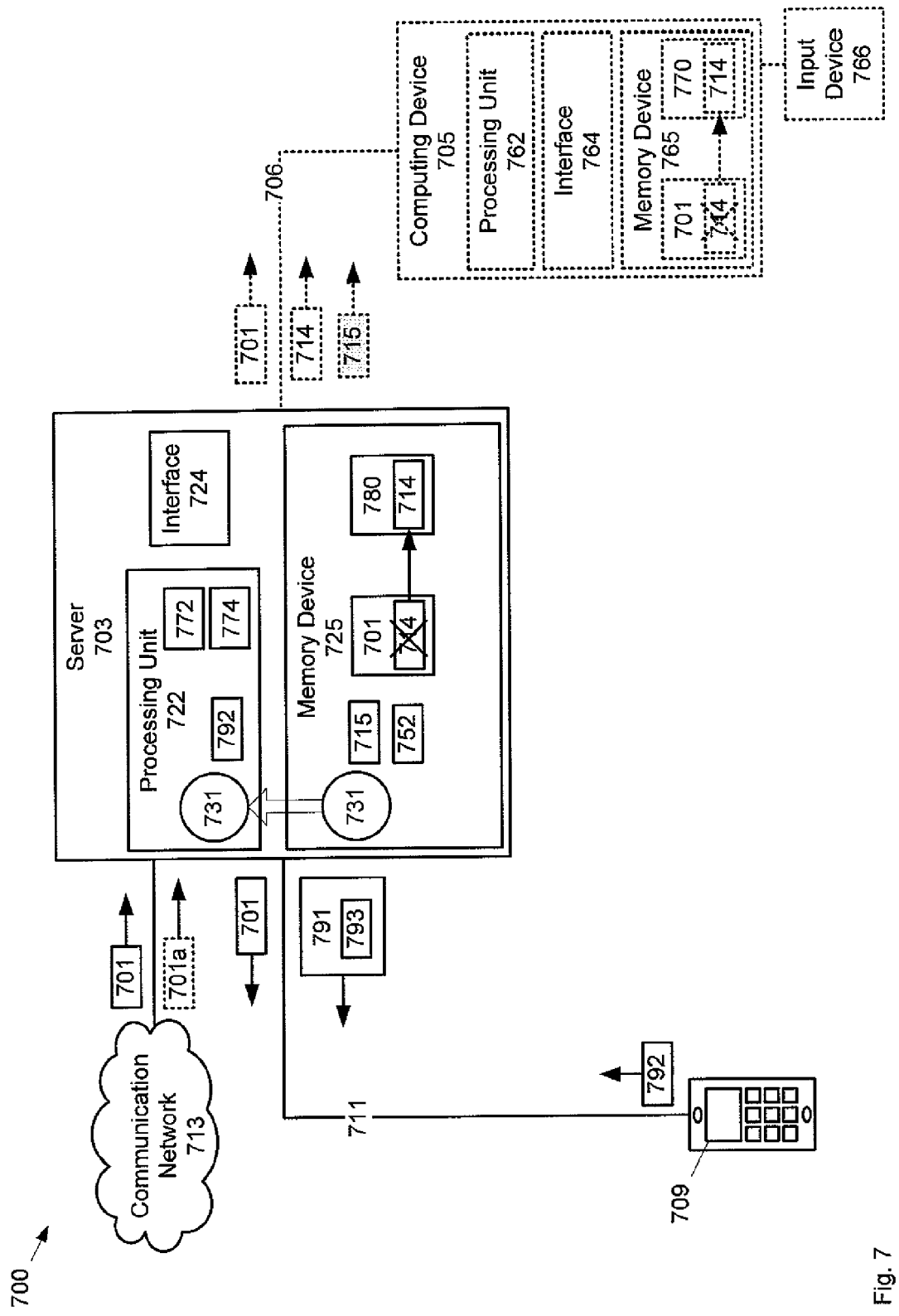

Attention is now directed to FIG. 7 depicting a system 700, similar to system 600 of FIG. 6, with like elements having like numbers, however preceded by a "7" rather than a "6". For example server 703 is similar to server 603. Furthermore, method 400 can be implemented in system 700. However, in these embodiments, computing device 705 may or may not be present in system 700. Hence, memory device 725 at server 703 comprises an archive directory 714 for archiving data such that when response 792 is received from mobile electronic device 709, subset 714 of data 701 is transferred to archive directory 780. In embodiments that comprise computing device 705, archiving command 715 can be transmitted to computing device 705 to cause further archiving (similar to that described with respect to FIGS. 2 and 6), as a backup to data stored in archiving directory 780. Archive directory 780 can be accessed remotely from any suitable computing device, including but not limited to mobile electronic device 709 and computing device 705, if present.

Figure 8:
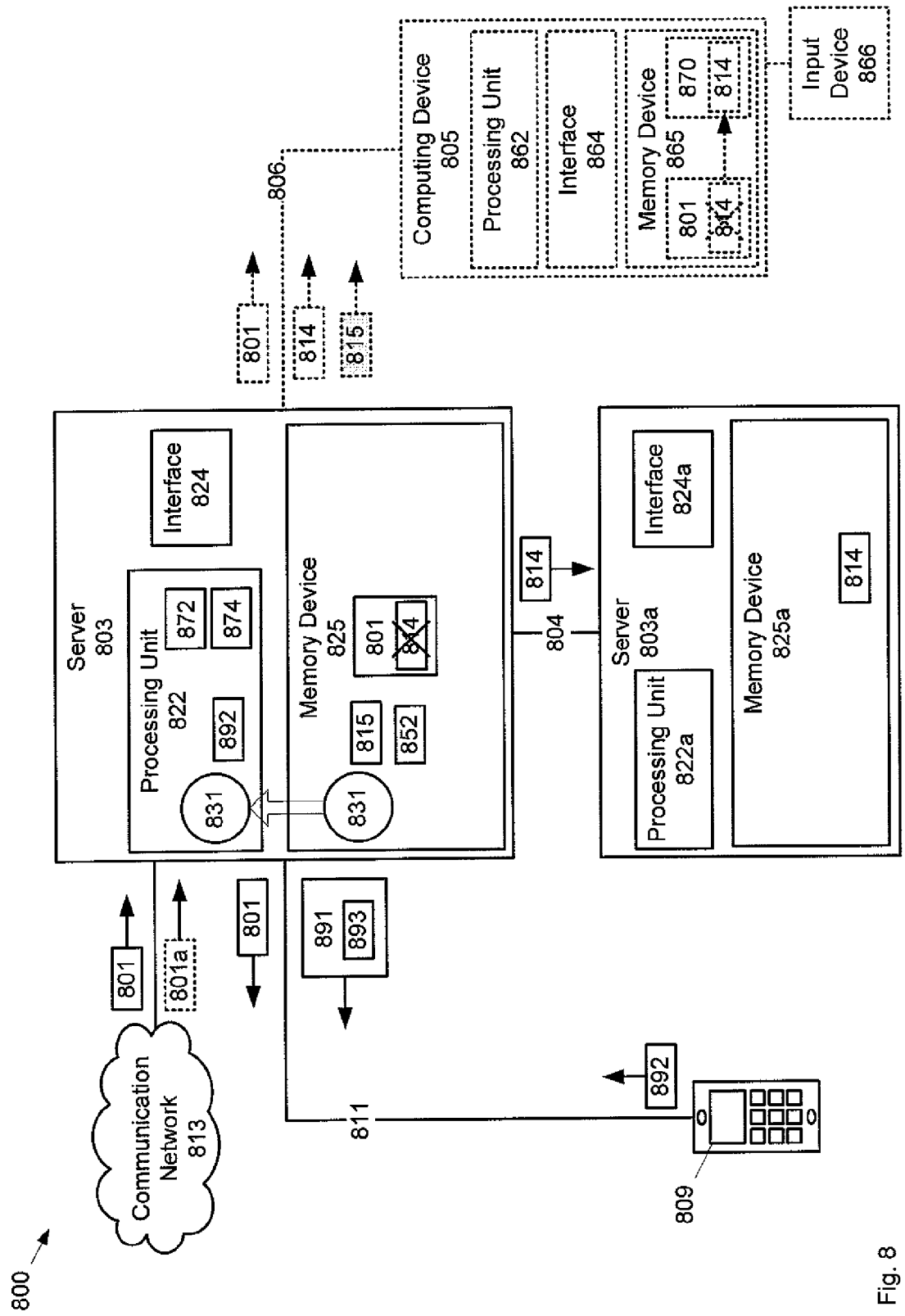

Attention is now directed to FIG. 8 depicting a system 800, similar to system 700 of FIG. 7, with like elements having like numbers, however preceded by an "8" rather than a "7". For example server 803 is similar to server 703. Furthermore, method 400 can be implemented in system 800. However, in these embodiments, system 800 comprises a second server 803a, similar to server 803, and in communication with server 803 via a link 804, which can be similar to link 206 described above. Furthermore, server 803a can comprise a processing unit 822a, a communication interface 824a and a memory device 825a, respectively similar to processing unit 822, communication interface 824 and memory device 825. In these embodiments, upon receipt of response 892, server 803 causes archiving of data 801 by transmitting subset 814 to server 803a for storage therein. Hence, in these embodiments, server 803a comprises at least one of an archive server and a mail server. In some embodiments, memory device 825a further comprises a database.

Figure 9:
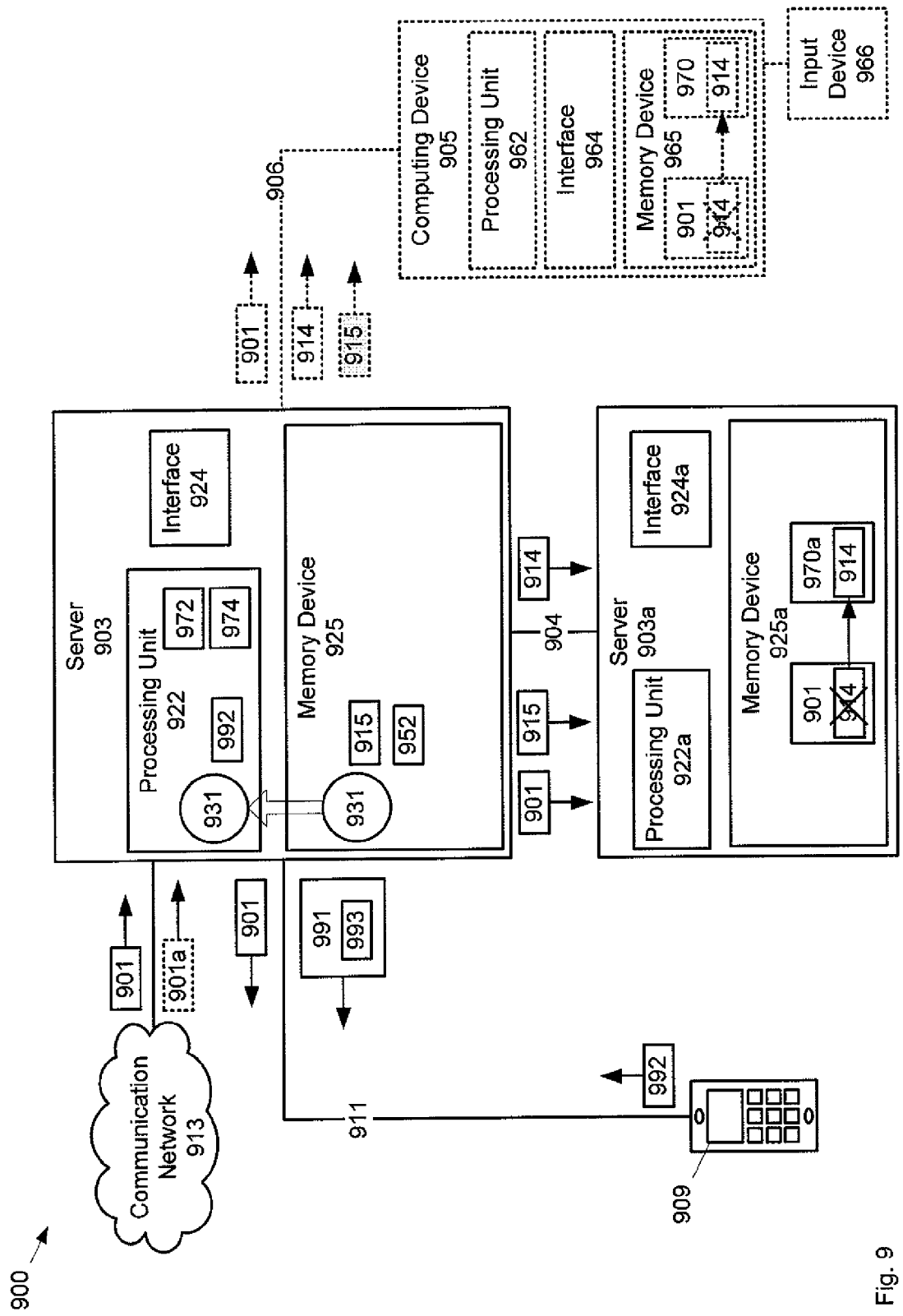

Attention is now directed to FIG. 9 depicting a system 900, similar to system 800 of FIG. 8, with like elements having like numbers, however preceded by a "9" rather than an "8". For example server 903 is similar to server 803. Furthermore, method 400 can be implemented in system 800. However, in these embodiments, server 903 manages data 901, but data 901 is stored at server 903a. Hence, server 903 transmits data 901 to server 903a for storage, including but not limited to subset 914. Hence, in response to receiving response 992, server 903 transmits archive command 915 to server 903a to cause server 903a to transfer subset 914 to an archiving directory 980a, similar to archiving directory 270 described above.

While various methods for archiving are described with reference to FIGS. 2, 6, 7 and 8, any suitable method for archiving is within the scope of present embodiments.

In any event, a computing device that normally triggers archiving of data at a server can be unable to do so, and/or can be delayed in doing so. Thus, further data received is discarded or lost due to limits placed on the amount of storage available for the data at a server managing the data (or an associated database and/or second server). In present embodiments, archiving of data is hence triggered by an associated mobile computing device upon notification from the server managing the data that a threshold condition for archiving has been met. The mobile electronic device triggers archiving of data by transmitting a response and/or archive command to the server, triggering the server to cause archiving of the data, thereby increasing memory available for storing further data. Hence, further data received is not lost and/or discarded.

Those skilled in the art will appreciate that in some embodiments, the functionality of server 203, 703, 803, 903, computing device 205, 705, 805, 905 and mobile electronic device 209, 709, 809, 909 can be implemented using pre-programmed hardware or firmware elements (e.g., application specific integrated circuits (ASICs), electrically erasable programmable read-only memories (EEPROMs), etc.), or other related components. In other embodiments, the functionality of server 203, 703, 803, 903, computing device 205, 705, 805, 905 and mobile electronic device 209, 709, 809, 909 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for archiving data managed by a server, comprising:
   determining that an amount of said data managed by said server meets a threshold condition;
   transmitting a message from said server to a mobile electronic device associated with said data, said message indicative that aid threshold condition has been met;
   receiving a response at said server from said mobile electronic device indicative that said data is to be archived; and
   causing at least a portion of said data to be archived thereby increasing memory available for storing further data.

2. The method of claim 1, wherein said determining that said amount of said data managed by said server meets said threshold condition comprises at least one of:
- determining that said amount of data meets or exceeds a threshold amount of memory;
- determining that said amount of data meets or exceeds a threshold percentage of memory; and
- determining that said amount of data meets or exceeds a threshold number of files.

3. The method of claim 1, wherein said transmitting said message to said mobile electronic device comprises transmitting an e-mail to said mobile electronic device said e-mail comprising an option to trigger archiving of said data.

4. The method of claim 1, wherein said receiving a response from said mobile electronic device indicative that said data is to be archived comprises receiving at least one of an e-mail, a text message, an SMS (short message service) message, an MMS (multimedia message service) message and wireless network data.

5. The method of claim 1, wherein said message comprises a selectable option to trigger transmitting said response from said mobile electronic device.

6. The method of claim 1, wherein said causing at least a portion of said data to be archived comprises:
- transmitting an archive command to a computing device causing a copy of said at least a portion stored at said computing device to be archived at said computing device; and
- deleting said at least said portion of said data managed by server.

7. The method of claim 6 further comprising transmitting said copy of said at least said portion to said computing device at least one of prior to said transmitting said archive command and with said archive command.

8. The method of claim 6, further comprising when said computing device is in not communication with said server, waiting until said computing device is in communication with said server before said transmitting occurs.

9. The method of claim 8, further comprising transferring said at least said portion to an archive directory in association with said waiting such that said further data can be stored.

10. The method of claim 9, further comprising deleting said at least said portion from said archive directory when communications between said computing device and said server are established.

11. The method of claim 1, wherein said causing at least said portion of said data to be archived comprises transferring at least said portion of said data to an archive directory at, at least one of said server and a second server.

12. A server for archiving data, comprising:
- a processing unit interconnected with a communication interface, said processing unit enabled to:
  - determine that an amount of said data managed by said server meets a threshold condition;
  - transmit, via said communication interface, a message from said server to a mobile electronic device associated with said data, said message indicative that said threshold condition has been met;
  - receive, via said communication interface, a response at said server from said mobile electronic device indicative that said data is to be archived; and
  - cause at least a portion of said data to be archived the eby increasing memory available for storing further data.

13. The server of claim 12, wherein to determine that said amount of said data managed by said server meets said threshold condition, said processing unit is further enabled to at least one of:
- determine that said amount of data meets or exceeds a threshold amount of memory;
- determine that said amount of data meets or exceeds a threshold percentage of memory; and
- determine that said amount of data meets or exceeds a threshold number of files.

14. The server of claim 12, wherein to transmit said message to said mobile electronic device said processing unit is further enabled to transmit, via said communication interface, an e-mail to said mobile electronic device, said e-mail comprising an option to trigger archiving of said data.

15. The server of claim 12, wherein to receive a response from said mobile electronic device indicative that said data is to be archived, said processing unit is further enabled to receive at least one of an e-mail, a text message, an SMS (short message service) message, an MMS (multimedia message service) message and wireless network data.

16. The server of claim 12, wherein said message comprises selectable option to trigger said mobile electronic device to transmit said response to said server.

17. The server of claim 12, wherein to cause at least said portion of said data to be archived said processing unit is further enabled to:
- transmit an archive command to a computing device causing a copy of said at least said portion stored at said computing device to be archived at said computing device; and
- delete said at least said portion of said data managed by server.

18. The server of claim 17, wherein said processing unit is further enabled to transmit said copy of said at least said portion to said computing device at least one of: prior to transmitting said archive command; and with said archive command.

19. The server of claim 17, wherein said processing unit is further enabled to, when said computing device is in not communication with said server, wait until said computing device is in communication with said server before said transmitting occurs.

20. The server of claim 19, wherein said processing unit is further enabled to transfer said at least said portion to an archive directory, while waiting until said computing device is in communication with said server, such that said further data can be stored.

21. The server of claim 20, wherein said processing unit is further enabled to delete said at least said portion from said archive directory when communications between said computing device and said server are established.

22. The server of claim 12, wherein to cause least said portion of said data to be archived, said processing unit is further enabled to transfer at least said portion of said data to an archive directory stored a memory device at, at least one of said server and a second server.

23. A mobile electronic device for archiving data, comprising:
- a processing unit interconnected with a communication interface, said processing unit enabled to:
  - receive, via said communication interface, a message from a server, said message indicative that an amount of said data managed by said server meets a threshold condition; and
  - transmit, via said communication interface, a response to said server indicative that said data is to be archived, said response causing said server to archive at leas a portion of said data thereby increasing an amount of memory managed by said server to be available for storing further data.

24. A non-transitory computer usable medium which stores a computer program product that when executed implements a method for archiving data managed by a server, said method comprising:
   determining that an amount of said data managed by said server meets a threshold condition;
   transmitting a message from said server to a mobile electronic device associated with said data, said message indicative that said threshold condition has been met;
   receiving a response at said server from said mobile electronic device indicative that said data is to be archived; and
   causing at least a portion of said data to be archived thereby increasing memory available for storing further data.

* * * * *

UNITED STATES PATENT AND TRADEMARK OFFICE
CERTIFICATE OF CORRECTION

PATENT NO. : 8,489,557 B2
APPLICATION NO. : 12/728628
DATED : July 16, 2013
INVENTOR(S) : Logan et al.

It is certified that error appears in the above-identified patent and that said Letters Patent is hereby corrected as shown below:

In the Claims

Claim 1, Col. 10, line 62 delete "aid" and insert --said--

Claim 7, Col. 11, line 31 after "6" insert --,--

Claim 12, Col. 11, line 62 delete "the eby" and insert --thereby--

Claim 16, Col. 12, line 19 after "comprises" insert --a--

Signed and Sealed this
Twenty-fourth Day of September, 2013

Teresa Stanek Rea
*Deputy Director of the United States Patent and Trademark Office*